July 21, 1953   M. J. SCHLITTERS   2,645,953
KNURLING AND BURNISHING TOOL HOLDER
Filed June 2, 1948   2 Sheets-Sheet 1

Inventor
Michael J. Schlitters
By J. S. Murray
Attorney

July 21, 1953 M. J. SCHLITTERS 2,645,953
KNURLING AND BURNISHING TOOL HOLDER
Filed June 2, 1948 2 Sheets-Sheet 2
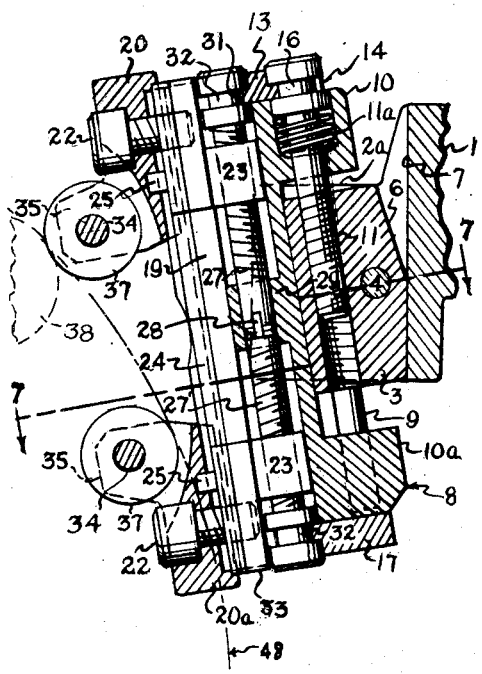
Inventor
Michael J. Schlitters Patented July 21, 1953

2,645,953

UNITED STATES PATENT OFFICE 2,645,953

KNURLING AND BURNISHING TOOL HOLDER

Michael J. Schlitters, Detroit, Mich.

Application June 2, 1948, Serial No. 30,553

12 Claims. (Cl. 80—5.1)

This invention relates to knurling and burnishing tool holders and particularly to these tools as adapted for screw machine and turret lathe use. Knurling tools may be classified, first, according to their use of one or a pair of knurling rollers, and second, as to advance to the work from the side or an end of the latter. The present invention relates to tools using paired rollers and advancing to the work from a side thereof.

An object of the invention is to provide a holder for a pair of work-engaging rollers affording such rollers a limited floating movement such that the rollers may adjust themselves to vibration of the work, or any slight flexing thereof, and to slight inaccuracies in relative positioning of the work and rollers.

Another object is to provide a holder for a pair of knurling rollers or the like, adapted to advance one thereof to a rotating piece of work slightly ahead of the other, whereby the first-engaging roller forms the work with faint impressions, to which the last-engaging roller conforms, thus synchronizing the two rollers in their action on the work.

Another object is to afford the mounting for a pair of knurling rollers, a limited rocking travel, whereby one thereof may take effect slightly in advance of the other, as the described tool is fed to the work, to yieldably resist retraction of the advanced roller by a spring or the like acting on said mounting, so that the work may receive an initial faint impression prior to such retraction, and to then utilize said rocking travel to establish a balanced engagement of both rollers within the work, said faint impression assuring a synchronized scoring action of the two rollers.

Another object is to provide a mounting as above described adapting either of the two knurling rollers to have advanced engagement with the work for producing the described initial faint impression.

Another object is to afford a considerable regulation of the spring means which initially gives effect to one of the rollers in advance of the other.

Another object is to provide a mounting on which two work-performing rollers are slidable to and from each other, and to adapt such rollers to be slidingly adjusted in common.

Another object is to mount a pair of roller-receiving arbors on holders detachably installed on opposite end portions of a mounting, and to effect a variation of the spacing of such arbors from one side of the mounting by interchanging said holders.

Another object is to slidably install a holder for a work-performing roller on a mounting, to adjust such holder by means of a feed nut driven by a suitable adjusting screw, and to further use the feed nut in clamping the holder rigidly on the mounting.

Another object is to provide a screw machine tool holder that will present two knurling or other rollers to the work and will automatically tilt upon disengagement of such rollers to increase clearance from the various work pieces during indexing.

These and various other objects are attained by the construction hereinafter described and illustrated in the accompanying drawings, wherein:

Fig. 6 is a fragmentary vertical sectional view, taken on the line 6—6 of Fig. 1.

Fig. 7 is a cross sectional view of the roller holder mounting, taken on the line 7—7 of Fig. 6.

Fig. 8 is a rear view of the shank of the improved tool holder.

Fig. 9 is a sectional view of said shank taken on the line 9—9 of Fig. 8.

Fig. 10 is a perspective view of one of the feed nuts employed in the improved tool holder.

Figures 1, 2, 3, 4, 5:
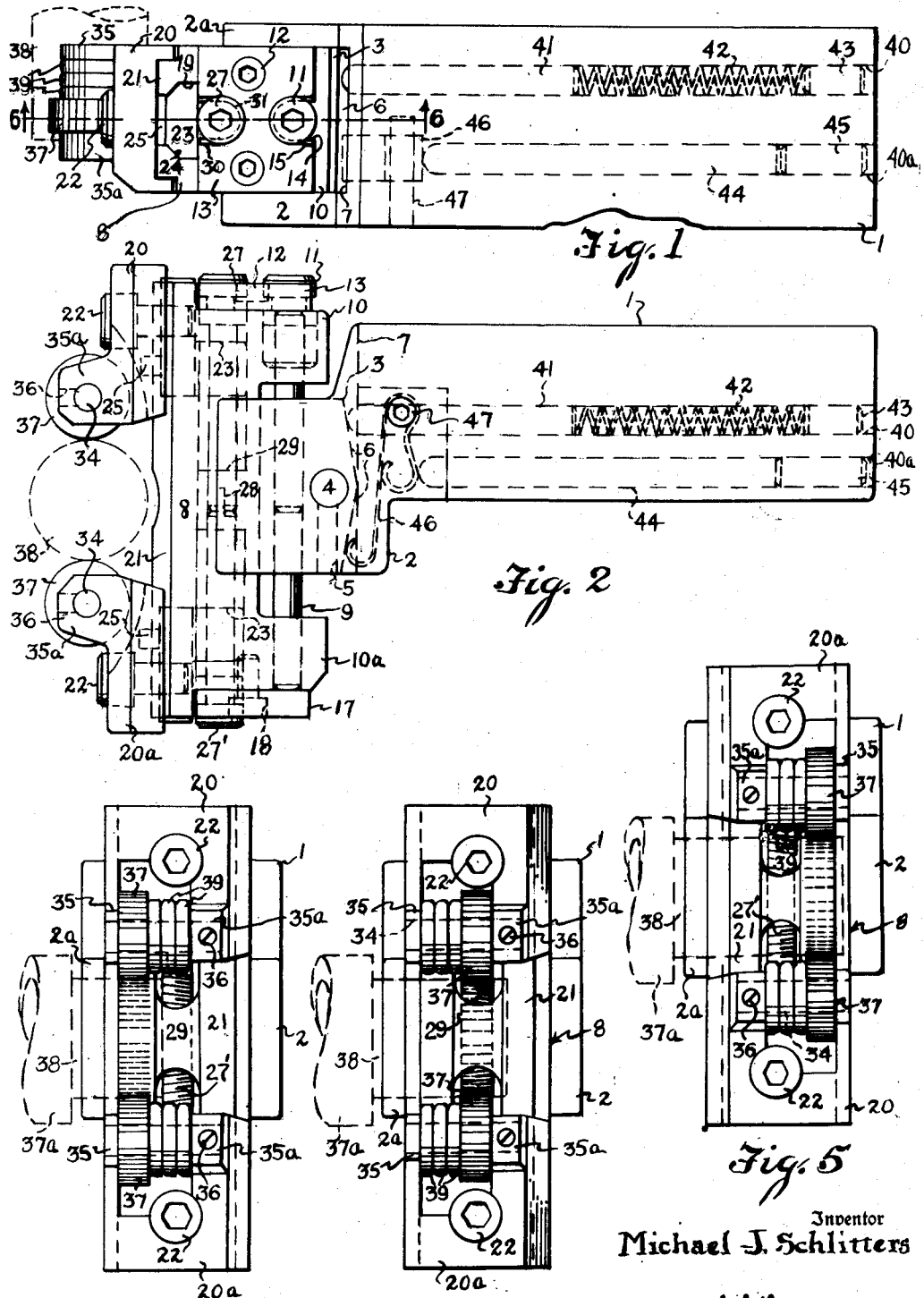
Fig. 1 is a top plan view of my improved tool holder.
Fig. 2 is a side elevational view of the same showing the normal working relation of a pair of rollers on the holder to a piece of work.
Fig. 3 is a front end view of the tool holder showing knurling rollers disposed to operate at a minimum distance from a screw machine spindle.
Fig. 4 is a view showing an increase of said distance effected by spacer collars on the roller arbors.
Fig. 5 is a view showing a further increase effected by reversing the location of holders for said arbors.

In these views, the reference character 1 designates an elongated rectangular shank, to be fixed in any desired manner on a side slide (not shown) of a screw machine or the cross feed carriage (not shown) of a lathe. The front end of said shank is bifurcated to form parallel plates 2 and 2a, respectively flush with the respective sides of the shank, the plate 2 being materially thicker than the plate 2a. Between such plates is fitted a block 3, pivoted for a limited rocking travel on a pin 4 transverse to said plates and fixed therein by a set screw 5. Said pin engages the block 3 in close proximity to the intersection of equal upper and lower rear faces 6 of the block, forming an included angle of 160 degrees, said intersection being substantially tangential to the front end face 7 of the shank. Rocking of the block in both directions is limited by contact of one or the other of the faces 6 with the shank face 7, and has preferably a range of 10 degrees in each direction from a mid position of the block.

The block 3 serves as a support and slide guide for a mounting 8, preferably substantially rectangular and held against the front face of the block by a pair of spaced pins 9 parallel to and equidistanct from said face and slidable in the block. The end portions of said pins are fixed in rearwardly projecting upper and lower portions 10 and 10a of the mounting 8, limiting up and down sliding adjustment of the mounting on the block. To effect such adjustment, a screw 11 parallel to and between the pins 9, is threaded in said block and has a headed end journaled in the projection 10. Surmounting said projection and fixed by screws 12 on the stop end of the mounting 8, is a plate 13 having a marginal notch 14 receiving the head of the screw 11. A flange 15 bordering said notch engages in an annular groove 16 of the screw to hold it from endwise play. A coiled spring 11a set into the projection 10 exerts sufficient endwise pressure against the head of screw 11 to restrain the latter from any accidental rotation. A plate 17 is fixed by screws 18 on the lower end of the mounting 8, the plates 13 and 17 covering the ends of the pins 9 and holding the latter in place.

The front face of the mounting 8 is grooved from end to end thereof, as indicated at 19, and bridging the groove are two vertically spaced holders 20 and 20a each straddling a pair of guide rails 21 formed marginally of said groove. To retain the holders in engagement with the slideway formed by said rails, a headed screw 22 attaches each holder to a corresponding feed nut 23 slidable in the groove 19 and retained therein by shoulders 24 formed on and coextensive in length with the walls of said groove. When the screws 22 are fully tightened they clamp the holders firmly to the slideway, maintaining any selected sliding adjustment of the holders. In effecting any such adjustment, the screws are loosened slightly. Each feed nut has a rectangular lug 25 projecting from said groove and inserted in a recess 26 formed in the rear face of the corresponding holder. This serves as an actuating connection, in adjusting the holders and also takes a portion of the stresses (hereinafter explained) acting separatively on the holders in use of the described tool. The two feed nuts are engaged respectively by right and left hand screws 27 and 27', occupying an aligned relation in the bottom portion of the groove, and jointly extending the full length of the groove. The inner ends of these screws have a tongue and groove interlock 28, whereby they are required to turn in unison, the interlocked end portions being received by a bearing 29 formed integrally with the mounting 8 and occupying the bottom portion of the groove 19. The outer ends of said screws are rotatable in notches 30 formed in the plates 13 and 17, such plates having flanges 31 bordering said notches and fitting in annular grooves 32 of the screws to resist endwise play thereof. It will be noted that the screws 22 engage tongue portions 33 of the feed nuts which portions project toward the unthreaded outer ends of the screws 27 and 27' and are adapted to overlap such ends when the two feed nuts have a maximum spacing, said tongue portions thus increasing the available spacing of the holders 20.

A pair of parallel arbors 34 are respectively mounted on the respective holders, transversely to the guide rails 21. The extremities of each arbor are fixed in lugs 35 and 35a, forwardly projecting from the corresponding holder, the lugs 35 being relatively thin and at that side of the mounting 8 which is engaged by the relatively thin plate 2a. The thicker lugs 35a are set back some distance from the side of the mounting engaged by the thicker plate 2 and mount set screws 36 holding the arbors in place. The purpose of this is to permit a pair of coacting knurling rollers 37 (or burnishing rollers) on said arbors to operate, if desired, in close proximity to a screw machine spindle 37a carrying a piece of work 38 to be knurled or burnished, said rollers being spaced apart transversely to their axes. Each arbor also preferably carries several spacer collars 39 which may be variously related to the rollers 37 (see Figs. 3 and 4) to space the latter a desired distance from the spindle side of the tool. A removal of the holders 20 from their positions shown in Figs. 3 and 4 and their replacement as per Fig. 5 permits various further increases in the spacing of rollers 37 from the spindle side of the tool.

To angularly adjust the mounting 8 and block 3 on the pivot 4, regulable spring pressures are forwardly applied to the block above and below said pivot. Thus the shank 1 has two openings 40 and 40a drilled from end to end thereof, the opening 40 receiving a round-nosed plunger 41 bearing on the upper face 6 of said block, a coiled spring 42 urging said plunger forwardly, and a screw 43 regulating the spring stress. The opening 40a receives a round-nosed plunger 44 and an adjusting screw 45 engaging the rear end of such plunger. The plunger 44 acts forwardly on a strip sheet metal spring 46 set into the forward portion of the shank and having an end portion engaging the lower face 6 of the block. By adjusting the screws 43 and 45, the mounting 8 may be tilted to either limiting position and yieldably retained in such position by a regulated force. The spring 46 is retained in its use position by a screw 47.

A chief advantage of the described tool holder is its adaptation, in using two knurling rollers, to assure a perfect synchronization or matching of their knurling impressions. While there has heretofore been some use of two rollers in a knurling operation, they have lacked synchronization, and the impression produced by one has more or less mutilated that resulting from the other. This has prevented working to precise dimensions and has not permitted uniformity in the production of knurled pieces. My improved tool holder, by adapting either roller to engage the rotating work in advance of the other, produces a slight initial impression such as will cause the later engaging roller to match its impression perfectly with that of the first engaging roller. After production of said slight impression, continued forward feeding of the tool holder will induce swinging of the mounting 8 to its mid position, due to the balanced reaction of the work on the two rollers. For any knurling job the spacing of the paired rollers will approximately equal the work diameter minus twice the depth of the grooves between serrations. The straddling relation of the two rollers to the work is a vital feature, minimizing the force required and permitting a perfectly balanced action of the two rollers in conjunction with the pivotally floating mounting. Also this relation renders negligible any tendency to induce flexure of the work. A straddling relation has been to some extent employed in end-feeding knurling tools but these are not suited to knurl remotely from the straddled end of the work and their use is not feasible if the portion to be knurled is of less diameter than some portion closer to the work extremity.

Ready adaptability of the described tool to a wide range of work diameters is a further vital feature of the described tool, and a material time saving is accomplished by adapting both roller holders to be shifted to and from each other by a single adjustment. By affording this adjustment at either outer end of the screws 21 and 21', the tool provides a further convenience.

A further important advantage of the described tool is its extensive range of adjustment of knurling or burnishing rolls along the axes thereof. The side slides of a screw machine cannot as a rule be shifted lengthwise of the work and a tool holder for use on such slides must afford any adjustment of that character. The adjustment afforded by the spacer collars and by reversing the location of the holders 20 greatly exceeds any adjustment heretofore available for a like purpose.

In using the tool for burnishing operations all of the discussed advantages accrue except that of synchronizing the knurl impressions of two rollers.

As compared to either single or double roller types of tools fed laterally against the work, the described tool is much to be preferred, whether used for knurling or burnishing. Such types strongly tend to deflect the work from its intended axis of rotation, create undue friction, and require unduly accurate limitation of their forward feed. Because of the straddling location of its rollers, no damage may be done by my improved tool holder if said rollers are advanced slightly beyond the axis of the work.

It is of further importance that automatic retraction of one of the rollers 20, upon disengagement thereof from the work increases the clearance requisite for indexing of screw machine spindles, and adapts the tool holder to machines and locations where the slide (not shown) carrying the holder may undergo very little retraction.

What I claim is:

1. A tool holder comprising a mounting having an elongated guideway, a pair of holders slidable to and from each other on said guideway, two aligned adjusting screws journaled in the mounting in substantial parallelism with said guideway, and respectively having right hand and left hand threads, means connecting said screws for rotation in unison, a pair of feed nuts respectively engaging the respective screws, and having operative engagement with said holders for sliding the holders along said guideway, each nut and the corresponding holder being relatively adjustable to and from each other, and adjustable connections from the holders to the corresponding feed nuts for clamping the holders rigidly on the mounting, the mounting having an elongated shoulder seating the feed nuts under the clamping stress set up by said connections.

2. A tool holder as set forth in claim 1, said adjustable connections comprising screws connecting the holders to the corresponding feed nuts for clamping such holders on the mounting.

3. A tool holder comprising a mounting forming an elongated guideway and formed with a groove extending longitudinally of such guideway, a pair of holders slidable to and from each other on said guideway, a pair of parallel arbors respectively installed on the respective holders transversely to said guideway, a pair of feed nuts retained in and guided by said groove, operative connections from the respective feed nuts to the respective holders for sliding the holders along said guideway, a pair of aligned reversely threaded adjusting screws respectively engaging the respective feed nuts and interconnected for rotation in unison, and a connection between each holder and the corresponding feed nut, such connection being adjustable to clamp the holder rigidly on the guideway, each holder being movable to and from the corresponding feed nut responsive to the last-mentioned connection.

4. A tool holder as set forth in claim 3, said groove having its opposed walls formed with elongated shoulders confining the feed nut and receiving stresses induced by said adjustable clamping connections.

5. A tool holder comprising a mounting, a pair of coacting knurls having parallel axes and spaced transversely to said axes to receive a piece of rotating work between such knurls, means for journalling the knurls on the mounting, a support for said mounting, means pivoting the mounting on said support to rock about an axis parallel to and substantially equidistant from the knurl axes, coacting means on said mounting and support positively limiting rocking of the mounting in both rotational directions about said pivot axis, springs reacting between the mounting and support yieldably resisting rocking in both said directions, and means for regulating said springs to tilt the mounting toward either limiting position of its rocking.

6. A tool holder as set forth in claim 5, said springs and their regulating means being housed in said support.

7. A tool holder comprising a mounting having an elongated guideway, a pair of holders slidable to and from each other on such guideway, a pair of parallel arbors respectively installed on the respective holders, means on said mounting for adjusting the holders to and from each other, a block carrying said mounting, means for adjusting the mounting on the block in parallelism with said guideway, a support for said block, means pivoting the block on the support to rock about an axis parallel to said arbors, means on said block and support coacting to limit rotation of the block in both rotational directions about said axis, springs reacting between the block and support yieldably resisting rocking about said axis in both said directions, and means for regulating said springs to tilt the block and mounting toward either limiting position of said rocking.

8. A tool holder comprising a mounting having a front face and a guideway on such face, a pair of holders, one slidable to and from the other on said guideway, a pair of parallel arbors respectively installed on the respective holders and elongated transversely to said guideway, a block carrying the mounting and disposed rearwardly of the mounting, an adjusting screw rotatable in the mounting for adjusting the sliding holder to and from the other holder, a feed nut engaged by said screw and operatively engaging the sliding holder, an adjusting screw parallel to said guideway and rotatable in the mounting and threaded in said block for shifting the mounting with reference to said block, and an element exteriorly fixed upon the mounting in engagement with both adjusting screws and including means for restraining such screws from endwise travel relative to the mounting.

9. A tool holder comprising a mounting forming an elongated guideway, and formed with a groove extending longitudinally of said guideway, a pair of holders slidable to and from each other on said guideway, a pair of feed nuts slidable in said groove for effecting sliding of the holders, the groove walls having shoulders confining the feed nuts, screw means for adjusting the feed nuts to and from each other, adjustable connections from the holders to the corresponding feed-nuts extending within said groove to clamp the feed nuts against said shoulders and clamp the holders on the guideway, the feed nuts having a feeding engagement with the corresponding holders to slide the holders along their guideway, affording relative play between each holder and the corresponding feed nut, responsive to said adjustable connections.

10. A tool holder comprising a mounting, a pair of coacting revoluble knurls, spaced apart transversely to their axes of rotation, means carried by the mounting for journaling the knurls, a support for the mounting, a pivot connecting the mounting to said support to rock about an axis parallel to the knurl axes, a spring reacting between said mounting and support biasing the mounting angularly about said pivot, means on the support limiting response of the mounting to said spring, and means limiting rocking of the mounting in opposition to the spring.

11. In a tool holder as set forth in claim 10, means for selectively regulating the stress of said spring.

12. A tool holder comprising a mounting formed with an elongated groove, a feed screw rotatively carried by the mounting within the groove, a holder exteriorly slidable upon the mounting lengthwise of the groove, a feed nut slidable in said groove and engaged by the feed screw, a lug fixed on the feed nut and set into the holder to shift the holder in unison with the feed nut, said mounting having flanges adjacent said groove and disposed between the holder and nut, and a screw having a head in engagement with the holder and a shank extending into threaded engagement with the feed nut to bring said holder and nut oppositely against said flanges for rigidly clamping the feed nut to the mounting.

MICHAEL J. SCHLITTERS.

References Cited in the file of this patent

UNITED STATES PATENTS

| Number | Name | Date |
|---|---|---|
| 637,320 | Billings | Nov. 21, 1899 |
| 667,311 | Henn | Feb. 5, 1901 |
| 898,697 | Spitt | Sept. 15, 1908 |
| 930,662 | Graham | Aug. 10, 1909 |
| 1,959,140 | Peterson | May 15, 1934 |
| 2,453,722 | Moss | Nov. 16, 1948 |
| 2,494,073 | Weaver | Jan. 10, 1950 |
| 2,497,059 | Thomas | Feb. 7, 1950 |